United States Patent
Tange et al.

(10) Patent No.: US 8,029,758 B2
(45) Date of Patent: Oct. 4, 2011

(54) PROCESS FOR PRODUCING SINGLE-WALLED CARBON NANOTUBES WITH INCREASED DIAMETER

(75) Inventors: Kyoichi Tange, Susono (JP); Shizuka Takeuchi, Susono (JP); Jiro Mizuno, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 120 days.

(21) Appl. No.: 12/096,247

(22) PCT Filed: Dec. 4, 2006

(86) PCT No.: PCT/JP2006/324602
§ 371 (c)(1),
(2), (4) Date: Nov. 24, 2009

(87) PCT Pub. No.: WO2007/066780
PCT Pub. Date: Jun. 14, 2007

(65) Prior Publication Data
US 2010/0061918 A1    Mar. 11, 2010

(30) Foreign Application Priority Data
Dec. 6, 2005   (JP) ................................. 2005-352117

(51) Int. Cl.
*D01F 9/12*   (2006.01)

(52) U.S. Cl. .................. 423/447.1; 423/447.2; 423/460; 977/750; 977/842

(58) Field of Classification Search ............... 423/447.1, 423/447.2; 977/750, 842
See application file for complete search history.

(56) References Cited

U.S. PATENT DOCUMENTS
2005/0079119 A1   4/2005   Kawakami et al.
2007/0253890 A1   11/2007  Nakayama et al.

FOREIGN PATENT DOCUMENTS
| JP | 2003-154260 | 5/2003 |
| JP | 2004-182573 | 7/2004 |
| JP | 2004-244309 | 9/2004 |
| JP | 2004-344775 | 12/2004 |
| JP | 2005-306681 | 11/2005 |
| JP | 2005-343746 | 12/2005 |
| JP | 2006-124225 | 5/2006 |

OTHER PUBLICATIONS

Yudasaka, M.; Kataura, H. et al.; "Diameter Enlargement of HiPco Single-Wall Carbon Nanotubes by Heat Treatment", Nano Letters. vol. 9 No. 1, 487-489. (2001).*

C. Liu et al., "Hydrogen Storage in Single-Walled Carbon Nanotubes at Room Temperature," Science, vol. 286, No. 5442, pp. 1127-1129 (Nov. 5, 1999).

(Continued)

*Primary Examiner* — Stuart Hendrickson
*Assistant Examiner* — Richard M Rump
(74) *Attorney, Agent, or Firm* — Finnegan, Henderson, Farabow, Garrett & Dunner, LLP

(57) ABSTRACT

There is provided a process for producing single-walled carbon nanotubes with an increased diameter, characterized in that it comprises a diameter-increasing treatment step of heating carbon nanotubes of a raw material at a degree of vacuum of $1.3 \times 10^{-2}$ Pa or below and at a temperature ranging from 1500 to 2000° C., preferably 1700 to 2000° C.

3 Claims, 2 Drawing Sheets

OTHER PUBLICATIONS

M. Yudasaka et al., "Structure Changes of Single-Wall Carbon Nanotubes and Single-Wall Carbon Nanohorns Caused by Heat Treatment," Carbon, vol. 41, No. 6, pp. 1273-1280 (2003).

P. Nikolaev et al., "Diameter Doubling of Single-Wall Nanotubes," Chemical Physics Letters, vol. 266, pp. 422-426 (1997).

S. Fang et al., "Raman Scattering Study of Coalesced Single Walled Carbon Nanotubes," J. Mater. Res., vol. 13, No. 9, pp. 2405-2410 (1998).

* cited by examiner

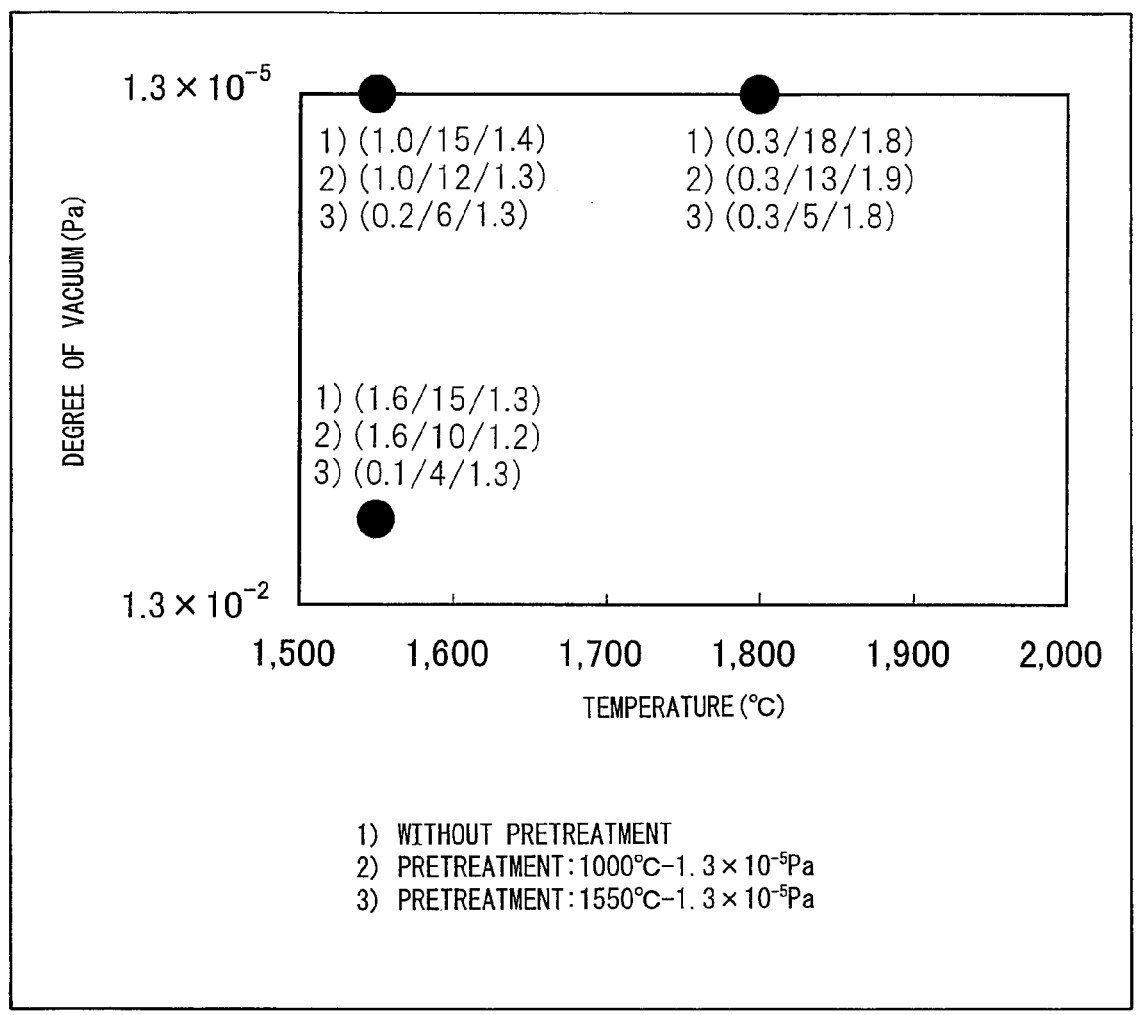

PROCESS FOR PRODUCING SINGLE-WALLED CARBON NANOTUBES WITH INCREASED DIAMETER

CROSS-REFERENCE TO RELATED APPLICATIONS

This application is a national phase application of International Application No. PCT/JP2006/324602, filed Dec. 4, 2006, and claims the priority of Japanese Application No. 2005-352117, filed Dec. 6, 2005, the content of both of which is incorporated herein by reference.

TECHNICAL FIELD

The present invention relates to a process for producing single-walled carbon nanotubes (SWNT) with an increased diameter.

RELATED ART

An important challenge in the development of a fuel-cell vehicle is the storage of hydrogen used as the fuel. Today, there is a fuel-cell vehicle on which a high-pressure hydrogen tank, in which hydrogen is stored at 350 atmospheres, is mounted, etc. Furthermore, liquid hydrogen liquified at a cryogenic temperature of $-253\,°$ C., hydrides which generate hydrogen through pyrolysis, metal hydrides (MH) and hydrogen storage materials such as activated carbon, etc., have been proposed as materials to be used in a hydrogen storage tank for a fuel-cell vehicle.

Since these materials are intended to be mounted in an automobile by a hydrogen storage tank, they are preferably lightweight and compact, and materials which ideally satisfy these requirements are desired. For example, carbon nanotubes, in particular, single-walled carbon nanotubes have attracted attention, and have been suggested as a potential gas storage material in other documents, etc. (see, for example, Japanese Unexamined Patent Publication (Kokai) No. 2003-154260).

However, there have been problems, for example, in impurities or a tube diameter with carbon nanotubes. The carbon nanotubes often contain in their product impurities such as a metal catalyst used in synthesizing the carbon nanotubes, and it is difficult to completely remove such impurities. Further, the carbon nanotubes can be synthesized by a variety of methods, for example, an arc discharge method, a laser deposition method or a chemical vapor deposition method (see, for example, Japanese Unexamined Patent Publication (Kokai) No. 2004-182573). However, since current commercially available single-walled carbon nanotubes have a small tube diameter, they are often not suitable for use in internal spaces thereof for gas storage. Therefore, in order to use carbon nanotubes as a gas storage material, it is necessary to enlarge, i.e., increase the tube diameter of them to an appropriate size.

Generally, it is known that the tube diameter of carbon nanotubes can be enlarged by high-temperature treating them under an atmosphere such as inert gas such that they coalesce. However, such a thermal treatment has a problem in that additional impurities such as graphite may be produced. Therefore, there is a need for a treatment method that can enlarge a tube diameter of carbon nanotubes while preventing impurities from producing.

Japanese Unexamined Patent Publication (Kokai) No. 2004-244309 (JPP'309) describes a method for producing nano-carbon materials by treating a raw material consisting of hydrocarbons, alcohols or a mixture thereof at a temperature of 100 to 800 ° C. and at a pressure of 0.2 to 60 MPa in the presence of a catalyst consisting of transition metal element-containing materials, etc. The produced nano-carbons are heat-treated in inert gas to remove residual impurities and improve the crystallinity of the nano-carbons. JPP'309 describes that in order to remove impurities, the heat treatment is preferably repeated several times by changing the temperature, for instance, in such a manner that the heat treatment is carried out at a temperature of 400 to 900° C., followed by the heat treatment at a temperature of 900 to 2800° C. JPP'309 further describes that the heat treatment at a temperature of 1500° C. or more can sublimate and remove a catalyst remaining in the produced nano-carbons.

However, since the heat treatment in JPP'309 is performed in an inert gas atmosphere, it is difficult to completely remove a metal catalyst for carbon nanotubes synthesis and which is contained in carbon nanotubes. Further, carbon nanotubes synthesized in JPP'309 are multi-walled carbon nanotubes, which have poor gas-storing capability per unit mass compared with the case of single-walled carbon nanotubes.

Thus, the object of the present invention is to provide a process for producing single-walled carbon nanotubes having an increased diameter and high purity.

DISCLOSURE OF THE INVENTION

According to the present invention, in order to achieve the above object, there is provided a process for producing single-walled carbon nanotubes with an increased diameter, characterized in that it comprises a diameter-increasing treatment step of heating carbon nanotubes of a raw material at a degree of vacuum of $1.3 \times 10^{-2}$ Pa or below and at a temperature ranging from 1500 to 2000° C., preferably 1700 to 2000° C.

Further, according to a preferable aspect of the present invention, there is provided a process for producing single-walled carbon nanotubes with an increased diameter, characterized in that it comprises a pretreatment step of heating carbon nanotubes of a raw material at a degree of vacuum of $1.3 \times 10^{-2}$ Pa or below and at a temperature ranging from 800 to 1700° C., preferably 1400 to 1600° C., more preferably 1500 to 1550 ° C.; and a diameter-increasing treatment step of heating the pretreated carbon nanotubes at a degree of vacuum of $1.3 \times 10^{-2}$ Pa or below and at a temperature ranging from 1500 to 2000° C., preferably 1700 to 2000° C.; wherein the diameter-increasing treatment step is carried out at a temperature higher than that in the pretreatment step. In this aspect, when the pretreatment step is carried out at a temperature of more than 1200°, the diameter-increasing treatment step is more preferably carried out in the above temperature range without lowering the temperature to 1200° C. or below after the pretreatment step.

Further, according to the present invention, there is provided a gas storage material using the above single-walled carbon nanotubes with an increased diameter.

According to the process of the present invention, single-walled carbon nanotubes having an increased diameter and high purity can be obtained.

BRIEF DESCRIPTION OF DRAWINGS

FIG. 2 shows impurity contents and tube diameters of single-walled carbon nanotubes treated under a variety of

BEST MODE FOR CARRYING OUT THE INVENTION

Figure 1:
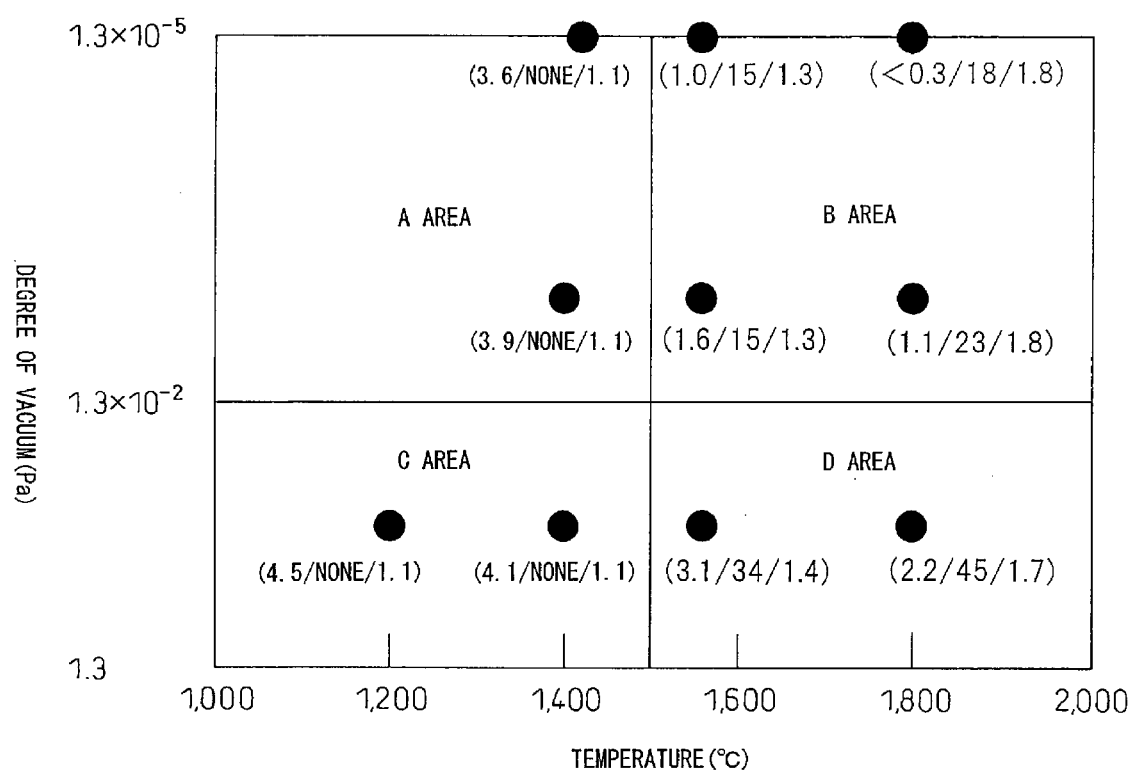
FIG. 1 shows impurity contents and tube diameters of single-walled carbon nanotubes treated under a variety of temperature and pressure conditions in accordance with the present invention.

A process for producing single-walled carbon nanotubes with an increased diameter of the present invention is characterized in that it comprises a diameter-increasing treatment step of heating carbon nanotubes of a raw material at a degree of vacuum of $1.3 \times 10^{-2}$ Pa or below and at a temperature ranging from 1500 to 2000° C., preferably 1700 to 2000° C. In a preferable aspect, the process of the present invention is characterized in that it has two steps comprising a pretreatment step of heating carbon nanotubes of a raw material at a degree of vacuum of $1.3 \times 10^{-2}$ Pa or below and at a temperature ranging from 800 to 1700° C., preferably 1400 to 1600 °0, more preferably 1500 to 1550° C. before the above diameter-increasing treatment step, wherein the diameter-increasing treatment step is carried out at a temperature higher than that in the pretreatment step.

Carbon nanotubes of a raw material subjected to the diameter-increasing treatment are preferably single-walled carbon nanotubes. In the case of multi-walled carbon nanotubes, a gas storage amount per unit mass thereof is small compared with the case of single-walled carbon nanotubes, since the multi-walled carbon nanotubes have dead spaces, which cannot contribute to gas storage, between layers thereof. Single-walled carbon nanotubes produced by any method known to a person skilled in the art may be used. However, single-walled carbon nanotubes synthesized by the HiPco (High Pressure CO) process which is a type of CVD process, i.e., single-walled carbon nanotubes synthesized by pyrolyzing carbon monoxide at a high pressure are preferably used, since the single-walled carbon nanotubes synthesized by the HiPco process do not contain graphite as impurities and have a high purity.

In order to improve the gas-storing capability of carbon nanotubes, they can be treated at a high temperature to enlarge, i.e., increase a tube diameter thereof.

According to the present invention, such a diameter-increasing treatment step is carried out at a temperature ranging from 1500 to 2000° C., preferably 1700 to 2000° C. When the temperature in the diameter-increasing treatment step is less than 1500° C., such a heat treatment has little effect on the increased diameter. On the other hand, when the temperature in the diameter-increasing treatment step is more than 2000° C., a tube diameter of some carbon nanotubes is increased to 5 nm or more, and such carbon nanotubes are not very effective to be used as a gas storage material. Since a too large tube diameter reduces the gas adsorption capacity of carbon nanotubes, it is important to increase the tube diameter to an appropriate size.

However, as described above, the diameter-increasing treatment produces impurities such as graphite. Since these impurities have little gas adsorption capacity, the presence of a large amount of the impurities in carbon nanotubes leads to reduction of the gas adsorption capacity of carbon nanotubes with an increased diameter. The mechanism by which the impurities are produced has not been fully clarified. Therefore, without being bound by any theory, it is believed that impurities such as graphite produced by the diameter-increasing treatment are produced by catalysis of a metal catalyst for carbon nanotubes synthesis, for example, Fe, which is essentially contained in carbon nanotubes of a raw material. In the diameter-increasing treatment, the structure of carbon nanotubes is partially broken by heating, and carbon nanotubes coalesce in the broken sites thereof, thereby a diameter thereof is enlarged. However, when a metal catalyst for carbon nanotubes synthesis is present during the coalescence of carbon nanotubes, decomposed carbons attach to this metal catalyst and grow as graphite from the attached sites. Although the amount of the produced graphite may vary depending on a treatment temperature, it is on the order of 10-50 wt % relative to the amount of products.

Thus, the metal catalyst contained in carbon nanotubes of a raw material is preferably reduced as far as possible. The metal catalyst contained in the carbon nanotubes can be removed by acid treatment with hydrochloric acid, sulfuric acid, etc. However, since this treatment cannot completely remove the metal catalyst, the metal catalyst of several percent remains to be removed. Further, the metal catalyst contained in the carbon nanotubes of a raw material can be sublimated by treating them at a high temperature of about 1500° C. or more. However, when the degree of vacuum during such a treatment is low, the sublimation rate becomes slow. As a result, graphitization of the nanotubes progresses during such slow sublimation. Therefore, in order to increase the sublimation rate of the catalyst to prevent impurities such as graphite from producing, the diameter-increasing treatment is preferably carried out at the degree of vacuum higher than that generally obtained by a rotary pump, etc.

According to the present invention, the diameter-increasing treatment step is carried out at a degree of vacuum of $1.3 \times 10^{-2}$ Pa or below. When the pressure in the diameter-increasing treatment step is higher than $1.3 \times 10^{-2}$ Pa, the metal catalyst contained in carbon nanotubes is not completely removed, resulting in production of a large amount of graphite as impurities.

Again, without being bound by any theory, it is believed that production of graphite during the diameter-increasing treatment is attributable to defects present in carbon nanotubes of a raw material. There are defects referred to as D band in carbon nanotubes. A large number of such defects promote production of impurities. Thus, heat treatment at a lower temperature can be carried out before the diameter-increasing treatment to reduce these defects and improve the crystallinity of carbon nanotubes. It is believed that such annealing effect prevents graphite from producing.

According to the present invention, this pretreatment step is carried out at a temperature ranging from 800 to 1700° C., preferably 1400 to 1600° C., more preferably 1500 to 1550° C.

When the temperature in the pretreatment step is less than 800° C., the obtained annealing effect is insufficient. Therefore, the pretreatment step is preferably carried out at a temperature of 800° C. or more. The pretreatment at a temperature of 1400 to 1600° C., especially 1500 to 1550° C. can not only provide the annealing effect, but also sublimate and remove a metal catalyst essentially contained in carbon nanotubes of a raw material. By removing the metal catalyst in the pretreatment step as far as possible, production of graphite as impurities can be inhibited in the subsequent diameter-increasing treatment.

However, when the pretreatment step is carried out at a temperature of more than 1600° C., especially more than 1700° C., or a high-temperature treatment is carried out in one step, removal of the metal catalyst and increase of a diameter in carbon nanotubes progress simultaneously. In such a case, carbons decomposed during the coalescence of carbon nanotubes may attach to the metal catalyst to produce graphite. Therefore, production of impurities is further inhibited by dividing a high-temperature treatment of the carbon nanotubes into two steps, i.e., a pretreatment step at a lower temperature having the annealing effect and/or catalyst removal effect and a diameter-increasing treatment step at a higher temperature. However, it has been found that once the temperature during the pretreatment is lowered before the catalyst being sufficiently removed, a large amount of graphite is produced when again raising the temperature for the diameter-increasing treatment. Graphite produced in this case had a capsule-shaped form. It is believed that carbons contained in the catalyst have been precipitated around the catalyst due to the lowered temperature, thereby graphite has been produced. Thus, when the heat treatment is carried out in two steps, the diameter-increasing treatment step is carried out at a temperature higher than that in the pretreatment step, preferably a temperature of 1700 to 2000° C. When the pretreatment step is carried out at a temperature of more than 1200° C., the diameter-increasing treatment step is preferably carried out without lowering the temperature to 1200° C. or below after the pretreatment step.

Although the treating times of the pretreatment step and diameter-increasing treatment step in the present invention vary depending on the conditions such as the amount of catalyst contained in carbon nanotubes of a raw material and the treatment temperature, generally, the treating time of the pretreatment step is 8 to 12 hours, for example, the treating time of the diameter-increasing treatment step at 1800° C. may be 2 to 8 hours.

The carbon nanotubes with an increased diameter of the present invention may be used as a gas storage material for storing gas such as hydrogen or natural gas. Since carbon nanotubes after increasing the diameter thereof have the cap structure with closed ends, gas can be introduced within the carbon nanotubes. Therefore, when the carbon nanotubes of the present invention are used as a gas storage material, this cap structure is opened by a partial oxidation after increasing the diameter of carbon nanotubes.

EXAMPLES

The present invention is described in detail below based on Examples, but the present invention is not limited thereto.

Example 1

In order to obtain single-walled carbon nanotubes having an increased diameter and high purity, experiments were performed under a variety of treating conditions. Single-walled carbon nanotubes synthesized by the HiPco process (Carbon Nanotechnologies, Inc. (CNI)) and having a mean tube diameter of about 1.1 nm were used as single-walled carbon nanotubes of a raw material. These carbon nanotubes of a raw material essentially contained a metal catalyst for carbon nanotubes synthesis, specifically Fe, in the amount of 20 to 30 wt %, and did not contain graphite.

The metal catalyst contained in the carbon nanotubes of a raw material was removed to 5 wt % by acid treatment with a hydrochloric acid aqueous solution (HCl:water=1:2). Then, the carbon nanotubes were subjected to a high temperature, high vacuum treatment in a high temperature, high vacuum furnace for 10 hours under a variety of conditions in which the temperature ranges from 1000 to 2000° C. and the degree of vacuum ranges from $1.3 \times 10^{-1}$ to $1.3 \times 10^{-5}$ Pa. The amount of catalyst (wt %) and the amount of graphite (wt %) contained in the treated carbon nanotubes and the mean tube diameter (nm) thereof were measured.

Each measurement was performed by the following measurement methods:

Tube diameter distribution measurement: Transmission electron microscope (TEM)

Catalyst amount measurement: Thermogravimetric analysis (TGA) (room temperature to 800° C. in air)

Graphite amount measurement: TGA, TEM

The experimental results are shown in FIG. 1. FIG. 1 shows impurity contents and tube diameters of single-walled carbon nanotubes treated under a variety of temperature and pressure conditions in accordance with the present invention. In FIG. 1, the treating temperature is plotted in the horizontal axis, and the treating degree of vacuum is plotted in the vertical axis. Numbers in brackets in the drawing represent (catalyst amount (wt %)/graphite amount (wt %)/mean tube diameter (nm)).

In A and C areas which are low temperature areas (less than 1500° C.) shown in FIG. 1, graphite of impurities was not produced. However, the catalyst removal effect was small and the tube diameters were not increased. On the other hand, in B and D areas which are high temperature areas (1500° C. or more), more catalysts were removed compared with the case of A and C areas, in particular, in the treating condition of 1800° C. and $1.3 \times 10^{-5}$ Pa in B area, the catalyst was reduced to the amount less than 0.3 wt %. Further, in both B and D areas, carbon nanotubes having larger tube diameters were obtained with an increase in treating temperature.

However, in D area in which the degree of vacuum is lower than $1.3 \times 10^{-2}$ Pa, a large amount of graphite of 30 wt % or more was produced.

As is clear from the results shown in FIG. 1, metal catalysts for carbon nanotubes synthesis essentially contained in carbon nanotubes of a raw material were reduced by subjecting the carbon nanotubes to a high temperature, high vacuum treatment under the conditions in B area in which the temperature is 1500° C. or more and the degree of vacuum is higher than $1.3 \times 10^{-2}$ Pa, thereby single-walled carbon nanotubes which had increased diameters and in which production of graphite as impurities was inhibited were obtained.

Example 2

With regard to the treating conditions in B area which were effective for the reduction of the catalyst and graphite amounts and the increase of diameters of carbon nanotubes in Example 1, the effect obtained by carrying out pretreatment at a lower temperature before the diameter-increasing treatment was studied. The same single-walled carbon nanotubes as those of Example 1 were used as a raw material. Acid treatment was not performed. The original catalyst amount in these carbon nanotubes of a raw material was 18 wt %.

The experimental results are shown in FIG. 2. FIG. 2 shows impurity contents and tube diameters of single-walled carbon nanotubes treated under a variety of temperature and pressure conditions comprising a pretreatment step in accordance with the present invention. In FIG. 2, as in FIG. 1, the treating temperature is plotted in the horizontal axis, and the treating degree of vacuum is plotted in the vertical axis. Numbers in brackets in the drawing represent (catalyst amount (wt %)/graphite amount (wt %)/mean tube diameter (nm)). Numbers shown in FIG. 2 represent the results obtained by subjecting single-walled carbon nanotubes to the diameter-increasing treatment for 10 hours under temperature and pressure conditions shown in FIG. 2 after pretreating at the temperature of 1000° C. and the degree of vacuum of $1.3 \times 10^{-5}$ Pa for 10 hours, or after pretreating at the temperature of 1550° C. and the degree of vacuum of $1.3 \times 10^{-5}$ Pa for 10 hours. For comparison, the values obtained by subjecting single-walled carbon nanotubes to the same diameter-increasing treatment without the pretreatment are shown as treatment 1).

From the results shown in FIG. 2, pretreating the carbon nanotubes of a raw material under the conditions of lower temperatures was effective for the reduction of the catalyst and graphite amounts, compared with the case of not carrying the pretreatment.

Example 3

With regard to the treating condition of 1800° C. and 1.3× $10^{-5}$ Pa in B area which was effective for the reduction of the catalyst and graphite amounts and the increase of diameters of carbon nanotubes in Example 1, the effect obtained by carrying out pretreatment at a variety of lower temperatures before the diameter-increasing treatment was studied. Single-walled carbon nanotubes subjected to the same acid treatment as that in Example 1 were used as a raw material. These single-walled carbon nanotubes were subjected to pretreatment at the predetermined temperature and the degree of vacuum of $1.3 \times 10^{-5}$ Pa for 8 hours, and then the diameter-increasing treatment at the temperature of 1800° C. and the degree of vacuum of $1.3 \times 10^{-5}$ Pa for 10 hours. The catalyst amount (wt %), the graphite amount (wt %) and the mean tube diameter (nm) with regard to the carbon nanotubes after the diameter-increasing treatment were measured. The results are shown in Table 1.

Table 1 shows the original catalyst amount (wt %), and the final catalyst amount (wt %), the graphite amount (wt %) and the mean tube diameter (nm) after the diameter-increasing treatment, in each of the carbon nanotubes pretreated at 1550° C., 1600° C., 1700° C. and 1800° C. Further, Table 1 shows values in the carbon nanotubes obtained by lowering the temperature to room temperature or 1250° C. after the pretreatment, then subjecting to the same diameter-increasing treatment, and by subjecting to only the diameter-increasing treatment without the pretreatment.

TABLE 1

Effect of Pretreatment in Diameter-increasing Treatment of Carbon Nanotubes

| Sample | Pretreatment | Original catalyst amount (wt %) | Final catalyst amount (wt %) | Graphite amount (wt %) | Mean tube diameter (nm) |
|---|---|---|---|---|---|
| 1 | 1550° C. | 5 | <0.3 | 5 | 1.8 |
| 2 | 1600° C. | 5 | <0.3 | 7 | 1.7 |
| 3 | 1700° C. | 5 | <0.3 | 15 | 1.7 |
| 4 | 1800° C. | 5 | <0.3 | 20 | 1.8 |
| A | 1550° C.→RT | 5 | <0.3 | 30 | 1.8 |
| B | 1550° C.→RT | 10 | <0.3 | 42 | 1.8 |
| C | 1550° C.→1250° C. | 5 | <0.3 | 7 | 1.8 |
| D | None | 5 | <0.3 | 18 | 1.8 |

From the results shown in Table 1, in all of the samples, carbon nanotubes having larger tube diameters were obtained. Among them, in samples 1 and 2 in which the carbon nanotubes of a raw material were pretreated under the conditions of lower temperatures, graphite amounts were greatly reduced, compared with sample D in which the pretreatment was not carried out. However, the amount of the produced graphite was increased with an increase in the pretreatment temperature (samples 3 and 4). Further, as is clear in samples A and B, it has been found that when lowering the temperature to room temperature after the pretreatment, then subjecting to the diameter-increasing treatment under a high temperature, high vacuum, the catalyst is also reduced, but a large amount of graphite is produced as impurities.

However, as is clear from sample C, lowering the temperature to 1250° C. after the pretreatment did not significantly affect production of impurities during the diameter-increasing treatment. Although addition of the pretreatment step makes a process complex, it is useful for applications in which carbon nanotubes having a higher purity are required.

Example 4

With regard to the carbon nanotubes of sample 1 which had a great effect on the reduction of the catalyst and graphite amounts and the increase of diameters of carbon nanotubes in Example 3, the cap structure of these carbon nanotubes was opened by air oxidation at about 450° C., and then their gas storage properties were determined. As a result, this sample had a specific surface area, determined in accordance with the BET method, of 1850 $m^2/g$, and exhibited a hydrogen storage amount of 1.45 mass% at 35 MPa and room temperature (25° C.). For comparison, the carbon nanotubes (the mean tube diameter: about 1.1 nm) of a raw material in Examples 1 to 3 were also subjected to the cap opening treatment, and then their gas storage properties were determined. As a result, the carbon nanotubes had a specific surface area, determined in accordance with the BET method, of 840 $m^2/g$, and exhibited a hydrogen storage amount of 0.4 mass % at 35 MPa and room temperature (25° C.).

INDUSTRIAL APPLICABILITY

The present invention is useful for production of single-walled carbon nanotubes with an increased diameter used as a gas storage material.

The invention claimed is:

1. A process for producing single-walled carbon nanotubes with an increased diameter, comprising:
   a pretreatment step of heating carbon nanotubes of a raw material at a degree of vacuum of $1.3 \times 10^{-2}$ Pa or below and at a temperature ranging from 1400 to 1600° C.; and
   a diameter-increasing treatment step of heating the pretreated carbon nanotubes at a degree of vacuum of $1.3 \times 10^{-2}$ Pa or below and at a temperature ranging from 1700 to 2000° C.,
   wherein the pretreatment step is carried out for 8 to 12 hours.

2. The process as claimed in claim 1, wherein the diameter-increasing treatment step is carried out without lowering the temperature to 1200° C. or below after the pretreatment step.

3. The process as claimed in claim 1 or 2, wherein the carbon nanotubes of a raw material are single-walled carbon nanotubes synthesized by the HiPco process.

* * * * *